United States Patent Office 3,564,618
Patented Feb. 23, 1971

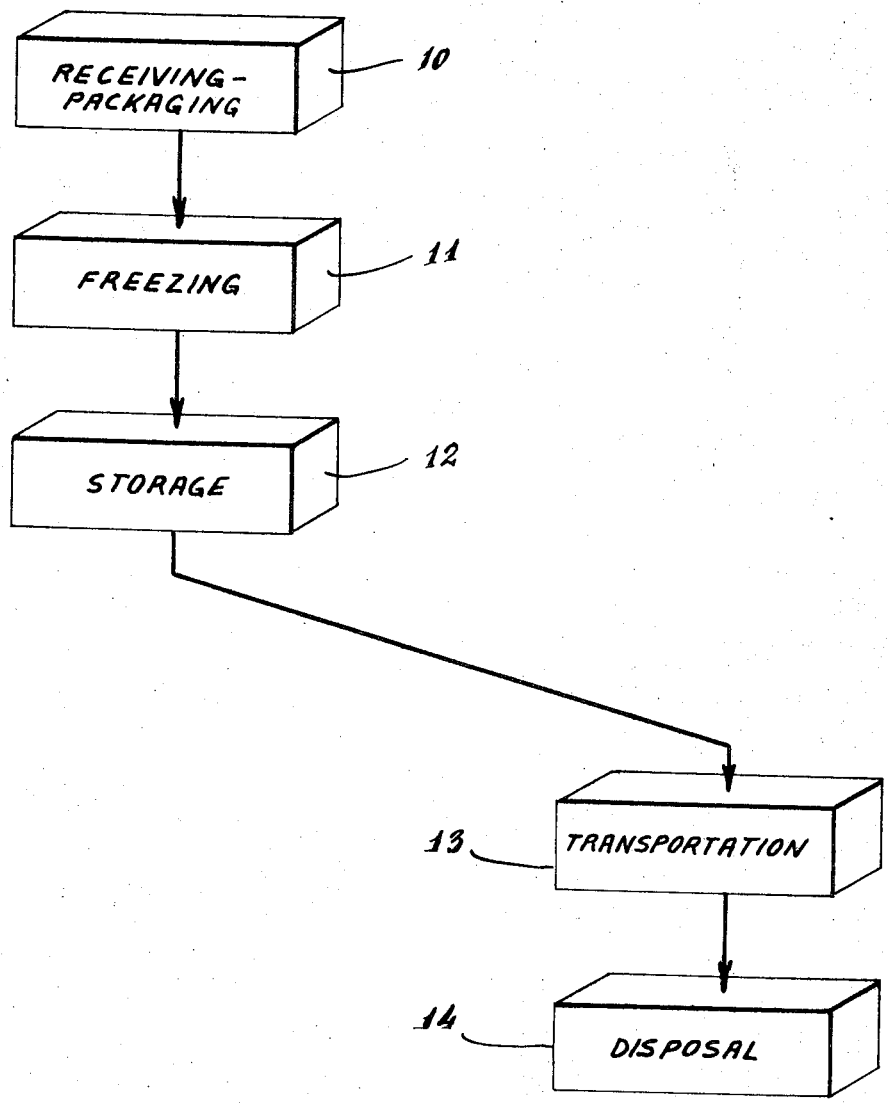

3,564,618
HANDLING AND DISPOSAL OF TOILET WASTES
Charles Ayres Williams, 1230 West St.,
Guilford, Conn. 06437
Filed Nov. 4, 1968, Ser. No. 773,194
Int. Cl. A47k 11/02
U.S. Cl. 4—1   4 Claims

ABSTRACT OF THE DISCLOSURE

This invention is a method of handling and disposal of toilet wastes, consisting of means for receiving such wastes, packaging and freezing such wastes to a solid state at the place of deposit, then transporting the frozen wastes to a disposal area.

---

This invention relates to sanitary systems and relates especially to a method of handling and disposal of toilet wastes, deposited in a dry toilet, by packaging and freezing such wastes to a solid state for transportation and disposal.

The present customary method of flushing toilet wastes with water to produce sewage which is conducted away through extensive underground sewerage systems and sewage treatment plants for disposal into a river, lake, or harbor requires large quantitites of water and often results in septic pollution of the river, lake, or harbor. The water used is generally potable water because there is but one system of water supply. With increasing population, additional supplies of potable water are increasingly difficult and expensive to provide and the pollution of rivers, lakes, and harbors becomes increasingly worse.

Residential development in new areas where no sewers exist has led to the use of individual septic tanks or cesspools for disposal of wastes. Since water supply in such areas is usually provided from individual driven wells, there exists the possibility of septic contamination of the water supply, particularly where sub-surface drainage conditions are poor. Individual disposal systems require regular maintenance which often is not provided by the owner, resulting in excessive costs for rebuilding and sometimes pollution of adjacent water supply.

Hence, one of the objects of the invention is to eliminate the need for septic tanks and thus to simplify disposal of other waste water.

Another object of the invention is to provide a method of disposal that does not pollute a river, lake, or harbor.

Another object of the invention is to provide a method of disposal that does not contribute to air pollution.

Another object of the invention is to provide a method of toilet waste disposal in a solid, frozen state for clean, convenient, sanitary handling, and disposal.

Another object of the invention is to offer a wide choice of disposal sites for toilet wastes by providing for their transportation in a solid, frozen state in vehicles over the ground, in vessels over water, or in airplanes, to a chosen disposal site not necessarily near the place of deposit.

Another object of the invention is to provide for the packaging and freezing of toilet wastes at the place of deposit for convenient storage, handling, and disposal.

Another object of the invention is to provide frozen storage at the place of deposit for such frozen, packaged toilet wastes for pick-up from time to time and loading into a suitable vehicle.

Another object of the invention is to utilize transportation vehicles, either ground or water or air, having low temperature compartments for transportation of frozen toilet wastes to a chosen site for disposal.

Another object of the invention is to provide a system for disposal of toilet wastes originating in airplanes, boats, buses, trailers, and railway cars that requires no water and thus reduces weight and bulk as compared with other systems.

Another object of the invention is to form a base for further research and development of components and equipment for use in this method of waste disposal, to eliminate pollution and increase available water supplies.

Other objects and advantages of the invention will be apparent from the following description when read in connection with the accompanying drawing.

Referring to the drawing, the figure shows a flow chart in which numeral 10 denotes the zone A in which the toilet waste is received in a container for processing as will subsequently be described. An example of such a container is shown in U.S. Pat. 2,671,906, issued Mar. 16, 1954, in which toilet waste is deposited and received in a tubular film which is subsequently sealed in sections for convenient disposal. Another example of such a container is shown in U.S. Pat. 2,801,426, issued Aug. 6, 1957, in which an impervious container is used for receiving toilet waste and subsequently closed into a bag by means of draw strings.

I then move the container with the toilet waste to a quick-freezing zone B, numeral 11 of the figure, where it is forthwith frozen to a solid state. Such a quick-freezing zone may utilize any of the well-known freezing methods. Examples are electro-mechanical freezing units for home freezers, gas or oil units for home refrigerators, and solid or liquid gas devices for frozen-food trucks. Desirably, for fast operation, several methods may be used, such as contact of the enfolded or packaged wastes with a massive plate cooled well below zero, vibration or agitation of the waste while in the freezing zone, or cyclic release of liquefied gas into the freezing zone to lower the temperature below that produced by other freezing means.

Continuing with the figure, I then move the frozen formation of toilet waste and container to a frozen-storage zone C, numeral 12, for subsequent removal and loading from time to time in a vehicle 13 containing a low temperature frozen storage compartment or compartments, zone D. Such vehicle is essentially the same as those presently in use for the transportation of frozen foods.

In another embodiment of my invention, I may use the means for receiving and packaging the toilet waste according to the method shown in U.S. Pat. 2,838,015, issued June 10, 1958, or U.S. Pat. 2,835,214, issued May 20, 1958. The method in these patents is to receive the toilet wastes onto a continuous belt of film or paper which is formed into a trough and pressed into a package by means of guides and rollers so as to enfold and contain said wastes for movement into another zone, in the case of these patents, into an incinerator.

In still another embodiment, I may freeze and store the formation in the same zone (zone B plus zone C).

The vehicle, numeral 13, then picks up and delivers its load of frozen, packaged toilet wastes to a pre-selected disposal site, zone E, number 14 of the figure. A suitable area would be desert land or other land where the waste could be buried or the site of abandoned mining operations. Or I may prefer to transport by land, water, or air the frozen wastes to a remote area such as the Arctic or the open ocean.

When it comes to the final disposition of the toilet wastes I may, as another embodiment, convert the wastes into fertilizer or humus by desiccation or according to other well-known methods.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. The method of handling toilet waste from place of origin to a disposal site comprising
   (a) receiving toilet waste on a container surface,
   (b) solidifying said waste by freezing after being received on said surface,
   (c) transporting said waste to a disposal site, and
   (d) maintaining said waste in said frozen solid state until reaching said disposal site.

2. The method of handling toilet waste according to claim 1 which includes storing said waste while in a solid frozen state to await transportation to the disposal site.

3. The method of handling toilet waste according to claim 2 which includes transporting said waste while in a frozen state to the disposal site.

4. The method of handling toilet waste according to claim 1 which includes closing said container surface before said freezing.

References Cited

UNITED STATES PATENTS

| | | | |
|---|---|---|---|
| 2,835,214 | 5/1958 | Harm | 4—131X |
| 2,838,015 | 6/1958 | Gleasman | 4—118X |
| 3,205,588 | 9/1965 | Oetjen | 210—71 |
| 3,457,567 | 7/1969 | Criss | 4—132 |

ALAN COHAN, Primary Examiner

U.S. Cl. X.R.

4—111